United States Patent [19]

Hsu

[11] Patent Number: 5,082,222
[45] Date of Patent: Jan. 21, 1992

[54] SUPPORTING DEVICE

[76] Inventor: C. C. Frank Hsu, No. 28, Chung-Hsing E. Rd., Tai-Ping Hsiang, Taichung Hsien, Taiwan

[21] Appl. No.: 625,475

[22] Filed: Dec. 11, 1990

[51] Int. Cl.$^5$ .............................................. F16M 11/38
[52] U.S. Cl. .................................. 248/170; 248/188.6
[58] Field of Search ............... 248/410, 170, 168, 188, 248/188.6, 188.7, 293, 190

[56] References Cited

U.S. PATENT DOCUMENTS

| 945,762 | 1/1910 | Dieleman | 248/293 |
|---|---|---|---|
| 1,666,568 | 4/1928 | Jackson | 248/293 |
| 1,863,756 | 6/1932 | Lufkin | 248/170 |
| 3,233,517 | 2/1966 | Morrison | 248/188.7 X |
| 4,010,922 | 3/1977 | Heller et al. | 248/170 X |
| 4,691,892 | 9/1987 | Grewe et al. | 248/170 X |
| 4,699,344 | 10/1987 | Vaughan | 248/170 |
| 4,735,392 | 4/1988 | Farmer | 248/188.6 X |
| 4,794,536 | 5/1988 | Bancalari | 248/188.7 X |
| 4,905,946 | 3/1990 | Wang | 248/170 |
| 4,907,770 | 3/1990 | Marchetti | 248/188.6 |

FOREIGN PATENT DOCUMENTS

| 0127545 | 11/1931 | Fed. Rep. of Germany | 248/188.6 |
|---|---|---|---|
| 0626748 | 5/1934 | Fed. Rep. of Germany | 248/188.6 |
| 1087342 | 2/1955 | France | 248/293 |
| 0562293 | 6/1944 | United Kingdom | 248/190 |

Primary Examiner—J. Franklin Foss
Attorney, Agent, or Firm—Fleit, Jacobson, Cohn, Price, Holman & Stern

[57] ABSTRACT

A supporting device includes a vertical tubular support apparatus, a connecting members which is engaged with the vertical tubular support apparatus and has a plurality of lug members, a plurality of engaging members each of which is pivotally mounted to one of the lug members, a plurality of resilient apparatuses each of which is disposed in one of the engaging members and has a strap, and a plurality of legs each of which is mounted to one of the engaging members. A curved end of the strap abuts a positioning pin of the engaging member and urges it to selectively engage one of a plurality of angularly spaced notches of the lug member, so the angle of each of the legs relative to the connecting member can be adjusted for convenience of use, moving, carrying and storage, or for use on an uneven surface.

2 Claims, 5 Drawing Sheets

SUPPORTING DEVICE

BACKGROUND OF THE INVENTION

This invention relates to a supporting device, and more particularly to a supporting device which is improved, easily and quickly operated for carrying a lamp, a camera or the like.

Referring to FIG. 1, a conventional supporting device includes a vertical tubular support 1 the top end of which is adapted to support a lamp instrument; a first connector 2 on which are pivoted a plurality of legs 3, the first connector 2 being fixed on the vertical tubular support 1; a second connector 2' provided around the bottom end of the vertical tubular support 1; and a plurality of connecting rods 4 each of which has two ends respectively attached to the second connector 2' and the intermediate portion of one of the legs 3. When each of the legs 3 extends outwards from the vertical tubular support 1, the inclination of it relative to the vertical tubular support 1 is unvarying. When the legs 3 are simultaneously turned downward and folded back to the vertical tubular support 1 for stowing the supporting device, the length of the supporting device is greater than when it is in use. Such a conventional supporting device is inconvenient to operate and store.

SUMMARY OF THE INVENTION

An object of the present invention is to provide a supporting device having a plurality of adjustable legs. The angular positions of the legs of the supporting device can be respectively and adjustably varied, so that the supporting device of the present invention can be conveniently folded for storage without occupying much space, and easily and quickly operated on an uneven surface.

According to the present invention, a supporting device comprises a vertical tubular support means having a top end to be connected to an article to be supported and a bottom end. A connecting member which is sleeved on the bottom end of the vertical tubular support means, and a plurality of lug members extend outward from the periphery of the connecting member in an equally spaced relation. Each of the lug members has a pivot hole and an arcuate edge with a plurality of angularly spaced notches which open away from the pivot hole. A plurality of engaging members, each of which is U-shaped in cross-section and has a positioning pin, each includes a first and a second opposite parallel plate pivotally mounted at the pivot hole of one of the lug members of the connecting member, sandwiching the lug member. Each engaging member also includes a base, interconnecting the first and second plates. The first and second plates has aligned oblong openings therein, and the long axes of the openings extend toward the pivot hole of the lug member to which the first and second plates pivotally mounted. The positioning pin passes through the oblong openings with the two ends of the positioning pin extending outward from the first and second plates, so that the positioning pin is confined but slidable in the aligned oblong openings. The positioning pin can slide along the long axis of the oblong opening and engage one of the notches of the lug member, preventing the engaging member from rotating about the lug member with which it is associated. A plurality of resilient means are respectively disposed in the engaging members to urge the positioning pins of the engaging members to engage the notches of the lug members. A plurality of legs are respectively mounted to the bases of the engaging members.

Furthermore, in one embodiment of the present invention, the resilient means includes a plate disposed against the base of one of the engaging members and a strap with a curved end bending away and extending from the plate. The curved ends of the straps of the resilient means respectively abut the contracted intermediate portions of the positioning pins.

Accordingly, the resilient means urges the positioning pin to selectively engage one of the angularly spaced notches of the lug member, so the angular position of each of the legs can be adjusted relative to the connecting member, for ease storing or positioning the device. Such a support device is convenient to use, move, carry and store.

BRIEF DESCRIPTION OF THE DRAWINGS

Other features and advantages of this invention will become apparent in the following detailed description of a preferred embodiment of this invention with reference to the accompanying drawings, of which.

DETAILED DESCRIPTION OF THE PREFERRED EMBODIMENT

Figure 1:
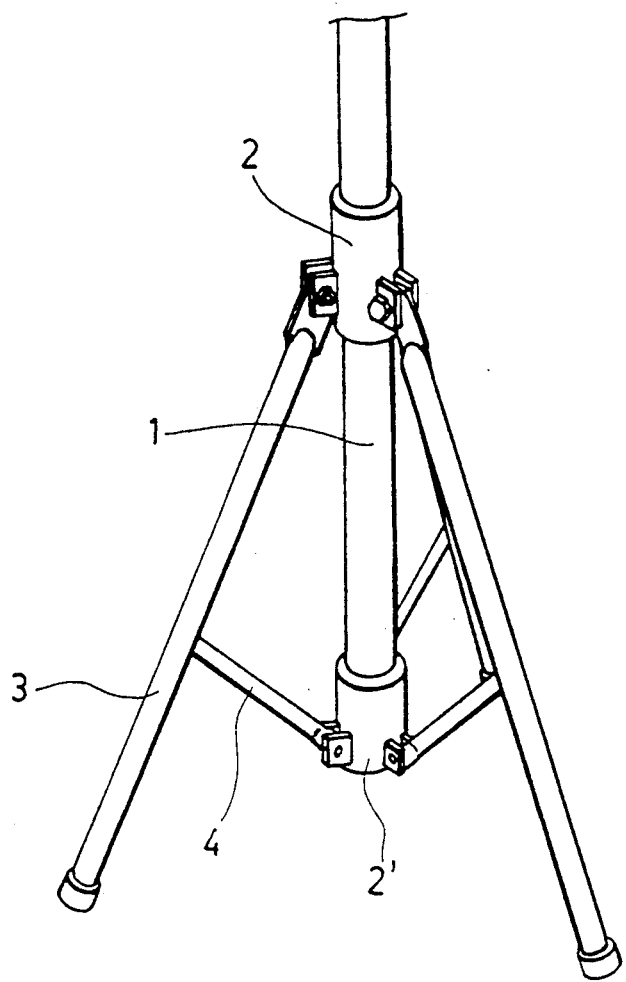
FIG. 1 is a perspective view of a supporting device of the prior art.
Figure 2:
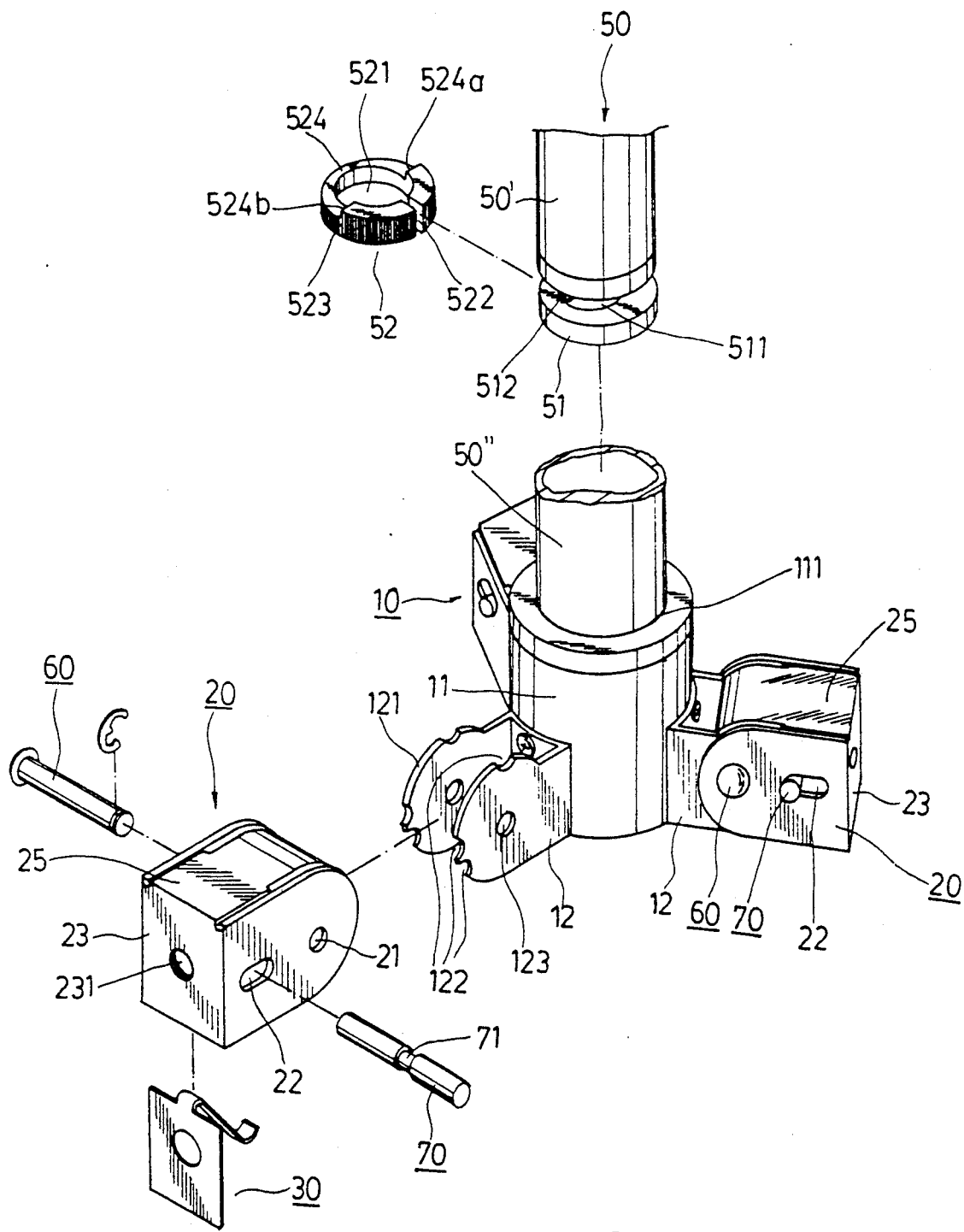
FIG. 2 is an exploded perspective view of the preferred embodiment of a supporting device of the present invention.
Figure 3:
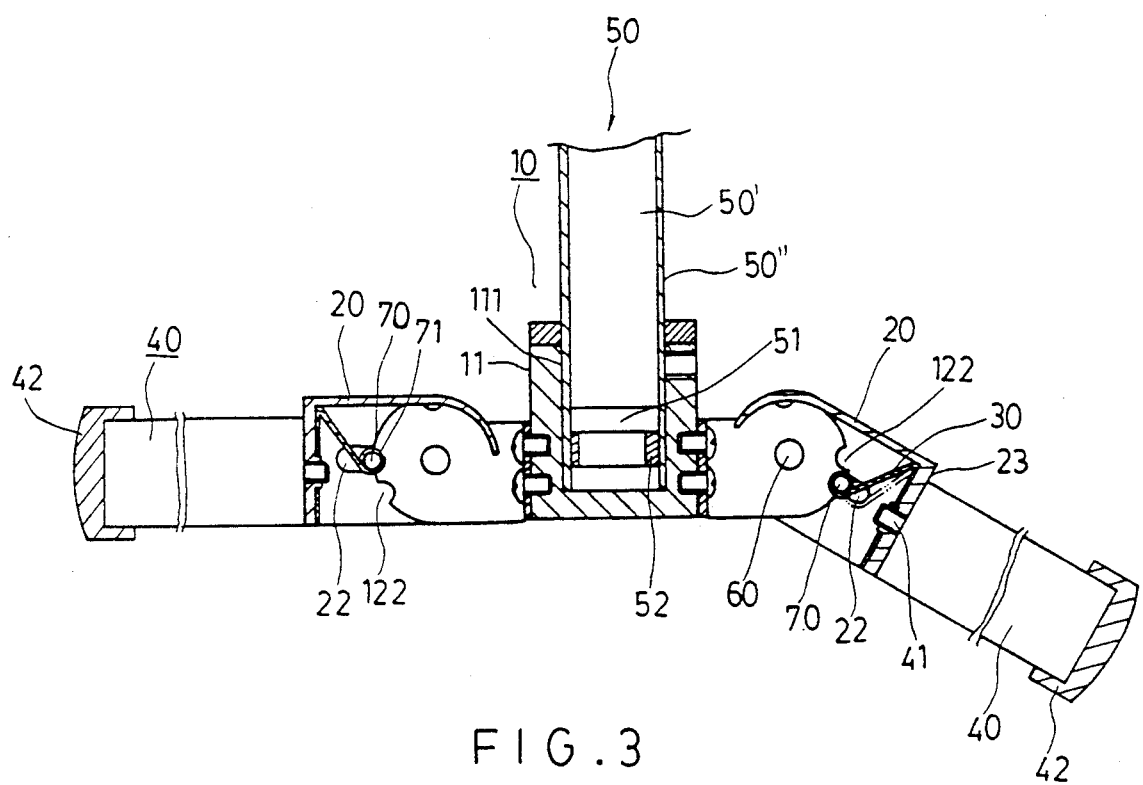
FIG. 3 is a sectional view of the preferred embodiment in FIG. 2.
Figure 4:
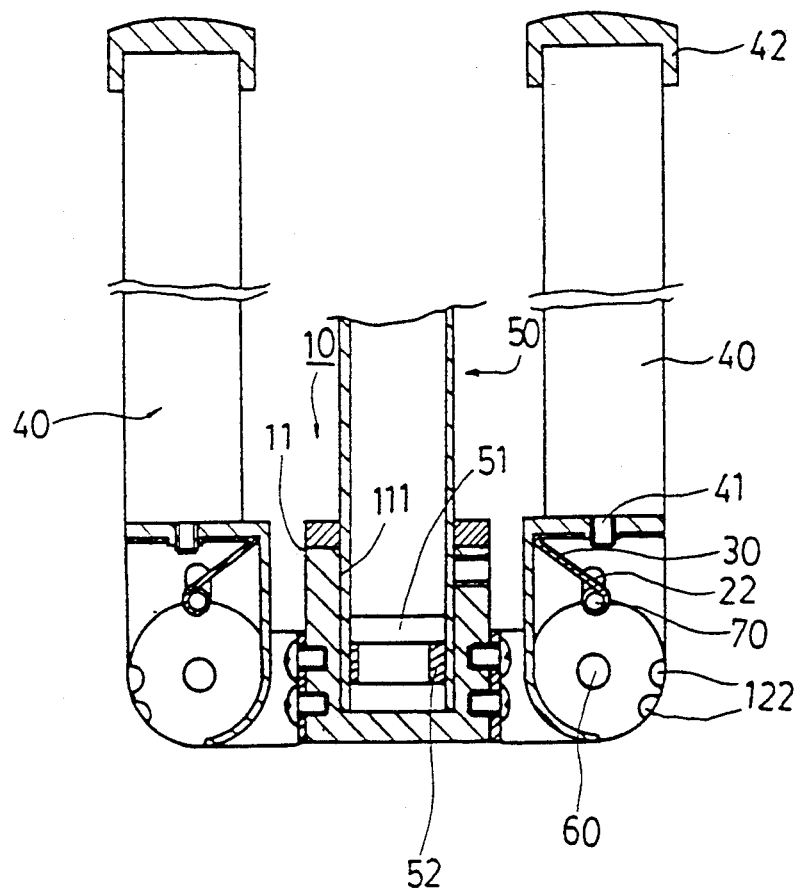
FIG. 4 is a sectional view of the preferred embodiment in FIG. 2 when the supporting device of the present invention is folded.

Referring to FIGS. 2, 3 and 4, a supporting device of the present invention includes a vertical tubular support means 50, a connecting member 10, a plurality of engaging members 20, a plurality of resilient means 30, and a plurality of legs 40. The connecting member 10 includes a cylindrical base member 11 formed with a mounting hole 111 for mounting the vertical tubular support means 50, and three lug members each of which has two opposite parallel platelike lugs 12 outwardly extending from the periphery of the base member 11. Each lug 12 has a pivot hole 123 and an arcuate edge 121 with three angularly spaced notches 122. The notches 122 open away from the center of the pivot hole 123. The pivot hole 123 of one lug 12 of each of the lug members is aligned with the pivot hole 123 of the opposite lug 12, and the notches 122 of each lug 12 are aligned with the notches 122 of the opposite lug 12. Each of the engaging members 20 is U-shaped in cross-section and includes a pivot pin 60, a positioning pin 70 having a contracted intermediate portion 71, a first and a second opposite parallel plate 24 each of which has an arcuate edge and a pivot hole 21, a base 23 with a threaded aperture 231 interconnecting the first and second plates 24, and a top covering 25 engaging with the first and second plates 24 and the base 23. The pivot pin 60 passes through the pivot holes 123 of the two lugs 12 of one of lug means and the associated pivot holes 21 of the first and second plates 24 to pivotally mount the engaging member 20 to one of the lug members. The first and second plates 24 include aligned oblong openings 22 respectively oriented such that their axes extend toward the centers of the pivot holes 123. The positioning pin 70 passes through the aligned oblong openings 22 and is free to slide laterally therein along the length of the openings 22 with the two ends of the positioning pin 70 projecting outward from the first and second plates 24. Each of the resilient means includes a plate with a threaded aperture 231 disposed against the base 23 of one of the engaging members 20, and a strap with a curved end bending away and extending from the plate. The curved end of the resilient means 30 abuts the contracted intermediate portion 71 of the positioning pin 70 and urges the positioning pin 70 into two aligned notches 122 of one of the lug members, to preventing the engaging member 20 from rotating relative to the lug member with which it is associated. Each of the legs includes a screw bolt 41 passing through the threaded aperture 231 of the base 23 of the engaging member 20 and the threaded aperture of the plate of the resilient means 30 to mount the leg to the engaging member 20. Each leg 40 also has a rubber cushion 42 on its foot end for positioning and preventing sliding.

Accordingly, the resilient means 30 urges the positioning pin 70 to selectively engage the aligned notches 122 of the lug member, so the position of each leg 40 relative to the connecting member 10 can be conveniently adjusted and set. This ease of adjustment facilitates use, move, carrying, and storage of the device, making the device of this invention more convenient to operate on an uneven surface, and generally easier to use and store than prior devices of the kind.

Figure 5:
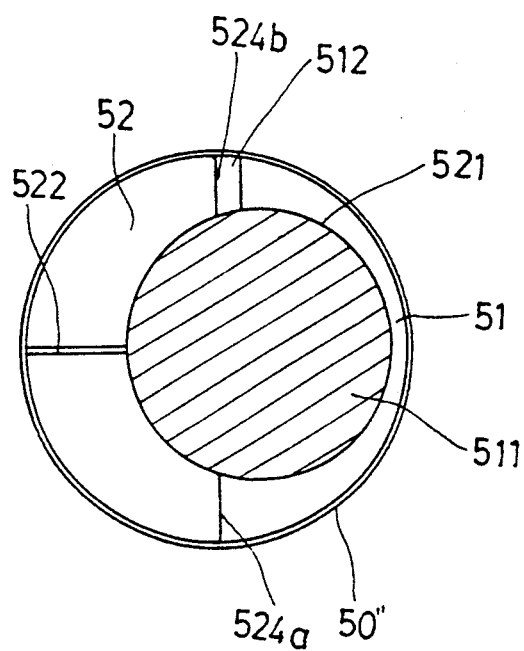
FIG. 5 is a schematic cross-sectional view of a joint member and a ring member of a vertical tubular support means of the preferred embodiment in FIG. 3 when a tube member of the vertical tubular support means is loosened.
Figure 6:
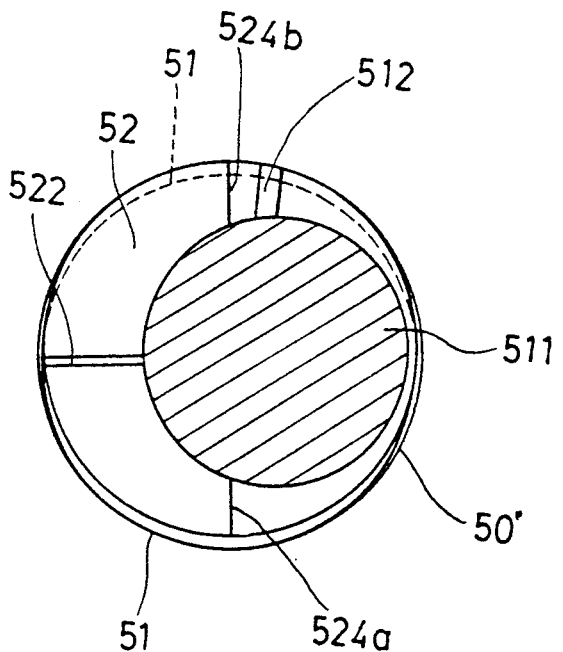
FIG. 6 is a schematic cross-sectional view of a joint member and a ring member of a vertical tubular support means of the preferred embodiment in FIG. 3 when a tube member of the vertical tubular support means is tightened.

Referring to FIG. 2, a vertical tubular support means 50 is mounted to the mounting hole 111 of the cylindrical base member 11. The top end of the vertical tubular support means is adapted to hold a lamp instrument. The vertical tubular support means 50 is extensible and contractible and includes a small tube member 50''. The small diameter tube member 50' has an joint member 51 including an eccentric neck 511 and a radial protrusion 512 projecting from the eccentric neck 511. A ring member 52 includes an axial eccentric hole 521, a radial opening 522, an outer tooth surface 523 and a concave portion 524 to form two shoulders 524a and 524b on the cross-section thereof. The ring member 52 is provided around the eccentric neck 511 of the joint member 51 in such a manner that the protrusion 512 of the joint member 51 is located between the two shoulders 524a and 524b of the ring member 52. Referring to FIGS. 5 and 6, when the small diameter tube member 50' is rotated in an anticlockwise direction, the protrusion 512 of the joint member 51 engages one of two shoulders 524b of the ring member 52. In this situation, the joint member 51 is concentric with the ring member 52. Therefore, the ring member 52 rotates together with the joint member 51 and the small diameter tube member 50' is rotatable and slidable relative to the large diameter tube member 50''. When the small diameter tube member 50' is rotated in a clockwise direction, the protrusion 512 moves away from the shoulder 524b of the ring member 52. The joint member 51 becomes eccentric relative to the ring member 52. Thus, a portion of the joint member 51 abuts with one side of the inner side of the wall of the large diameter tube member 50'' and a portion of the ring member 52 abuts with the other side of the inner side of the wall of the large diameter tube member 50''. The continued rotation of the small diameter tube member 50' causes the joint member 51 and the outer tooth surface 523 of the ring member 52 to engage more tightly and tightly the wall of the large diameter tube member 50''. As the result, the small diameter tube member 50' is tightly fitted in the large diameter tube member 50''.

The small diameter tube member 50' of the vertical tubular support means 50 can be fixed at any position in the large diameter tube member 50'' by means of the joint member 51 and the ring member 52 which can tightly engage the wall of the large diameter tube member 50''. So that the vertical tubular support means 50 can be conveniently adjusted in height relative to the connecting member 10.

While the present invention has been described in connection with what is considered the most practical and preferred embodiment, it is understood that the invention is not limited to the disclosed embodiments, but is intended to cover various arrangements included within the spirit and scope of the broadest modifications and equivalent arrangements.

I claim:
1. A supporting device comprising:
   a vertical tubular support means having a top end to be connected to an article to be supported and a bottom end;
   a connected member which is sleeved on said bottom end of said vertical tubular support means, said connecting member having a periphery and a plurality of lug members outwardly extending from said periphery in an equally spaced relation, each of said lug members having a pivot hole and an arcuate edge with a plurality of angularly spaced notches each of which notches open away from said pivot hole;
   a plurality of engaging members each of which is U-shaped in cross-section and has a positioning pin, a first and a second opposite parallel plate pivotally mounted at said pivot hole of one of said lug members of said connecting member to sandwich it, and a base interconnecting said first and second plates, said first and second plates having aligned oblong openings therein the long axes of which extend toward said pivot hole of the said lug member to which said first and second plates are pivotally mounted, said positioning pin passing through said oblong openings with the two ends of said positioning pin extending outward from said first and second plates, said positioning pin being laterally slidable in said aligned oblong openings to engage one of said notches of said lug member for preventing said engaging member from rotating about said lug member;
   a plurality of resilient means each of which is disposed in one of said engaging members to urge said positioning pin of said one of said engaging members to engage one of said notches of said one of said lug members; and
   a plurality of legs each of which is mounted to one of said bases of said engaging members;
   whereby, the angular position of each of the legs, relative to said connecting member, can be selec- tively varied and fixed wherein each said resilient means includes a plate disposed against said base of one of said engaging members and a strap with a curved end extending from said plate at an acute angle, said curved end embracing the respective positioning pin.

2. A supporting device as claimed in claim 1, wherein each of said positioning pins has a contracted intermediate portion which said curved end of said strap of said resilient means embraces.

* * * * *